(12) United States Patent
Lewis et al.

(10) Patent No.: US 11,784,845 B2
(45) Date of Patent: Oct. 10, 2023

(54) SYSTEM AND METHOD FOR DISAMBIGUATION OF INTERNET-OF-THINGS DEVICES

(71) Applicant: QUALCOMM Incorporated, San Diego, CA (US)

(72) Inventors: M Anthony Lewis, La Jolla, CA (US); Amalendu Iyer, San Diego, CA (US); Manu Rastogi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1158 days.

(21) Appl. No.: 16/147,319

(22) Filed: Sep. 28, 2018

(65) Prior Publication Data

US 2020/0106632 A1 Apr. 2, 2020

(51) Int. Cl.
*H04L 12/28* (2006.01)
*G06T 7/73* (2017.01)
*H04W 8/22* (2009.01)
*H04W 60/00* (2009.01)
*H04W 64/00* (2009.01)

(52) U.S. Cl.
CPC .............. *H04L 12/282* (2013.01); *G06T 7/74* (2017.01); *H04W 8/22* (2013.01); *H04W 60/00* (2013.01); *H04W 64/003* (2013.01)

(58) Field of Classification Search
CPC ....... G06T 7/74; H04L 12/282; H04L 67/125; H04L 67/16; H04W 8/22; H04W 60/00; H04W 64/003
See application file for complete search history.

(56) References Cited

U.S. PATENT DOCUMENTS

| 8,818,274 B2 | 8/2014 | Grob et al. |
| 8,971,811 B2 | 3/2015 | Grob et al. |
| 9,372,922 B2 | 6/2016 | Shaashua et al. |
| 9,667,817 B2 | 5/2017 | Grob et al. |

(Continued)

FOREIGN PATENT DOCUMENTS

| CN | 106878422 A | 6/2017 | |
| EP | 3493484 A1 | 6/2019 | |
| WO | WO-2019180434 A1 * | 9/2019 | ............. G05B 15/02 |

OTHER PUBLICATIONS

International Search Report and Written Opinion—PCT/US2019/053326—ISA/EPO—dated Dec. 17, 2019.
Taiwan Search Report—TW108135194—TIPO—dated Oct. 24, 2022.

*Primary Examiner* — Khoa Huynh
(74) *Attorney, Agent, or Firm* — ArentFox Schiff LLP

(57) ABSTRACT

An apparatus may identify each object of a set of objects included in a first location, wherein the set of objects includes at least one IoT device and at least one other object. The apparatus may determine a first set of attributes for the at least one IoT device. The apparatus may store registration information associated with the at least one IoT device, the registration information including a first identifier associated with the at least one IoT device and including the first set of attributes for the at least one IoT device. The apparatus may obtain an input. The apparatus may determine whether the input corresponds to the at least one IoT device based on the registration information associated with the at least one IoT device. The apparatus may control the at least one IoT device when the input corresponds to the at least one IoT device.

28 Claims, 8 Drawing Sheets

(56) References Cited

U.S. PATENT DOCUMENTS

| | | |
|---|---|---|
| 2014/0108943 A1 | 4/2014 | Lee et al. |
| 2015/0347114 A1* | 12/2015 | Yoon ................ H04L 12/2832 |
| | | 717/176 |
| 2016/0378080 A1 | 12/2016 | Uppala et al. |
| 2017/0041271 A1 | 2/2017 | Tal et al. |
| 2017/0160813 A1 | 6/2017 | Divakaran et al. |
| 2017/0311053 A1 | 10/2017 | Ganjam et al. |
| 2018/0034913 A1* | 2/2018 | Matthieu ................ H04L 67/52 |
| 2020/0099748 A1* | 3/2020 | Cambridge ............ H04W 4/70 |

* cited by examiner

SYSTEM AND METHOD FOR DISAMBIGUATION OF INTERNET-OF-THINGS DEVICES

BACKGROUND

Field

Certain aspects of the present disclosure generally relate to machine learning and, more particularly, to improving systems and methods of identifying and registering one or more Internet-of-Things devices.

Background

An artificial neural network, which may include an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep neural networks (DNNs) may be trained to recognize a hierarchy of features and so they have increasingly been used in object recognition applications. Other models are also available for object recognition. For example, support vector machines (SVMs) are learning tools that can be applied for classification. Although these solutions achieve excellent results on a number of classification benchmarks, their computational complexity can be prohibitively high. Additionally, training of the models may be challenging.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

In an aspect of the disclosure, a method, a computer readable medium, and apparatus for operating a computational network are provided. The apparatus includes a memory and at least one processor coupled to the memory. The at least one processor may be configured to identify each object of a set of objects included in a first location, and the set of objects may include at least one IoT device and at least one other object. The at least one processor may be configured to determine a first set of attributes for the at least one IoT device, and the first set of attributes may indicate a first spatial relationship between the at least one IoT device and the at least one other object. The at least one processor may be configured to store registration information associated with the at least one IoT device, and the registration information may include a first identifier associated with the at least one IoT device and may include the first set of attributes for the at least one IoT device. The at least one processor may be configured to obtain an input. The at least one processor may be configured to determine whether the input corresponds to the at least one IoT device based on the registration information associated with the at least one IoT device. The at least one processor may be configured to control the at least one IoT device when the input corresponds to the at least one IoT device.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
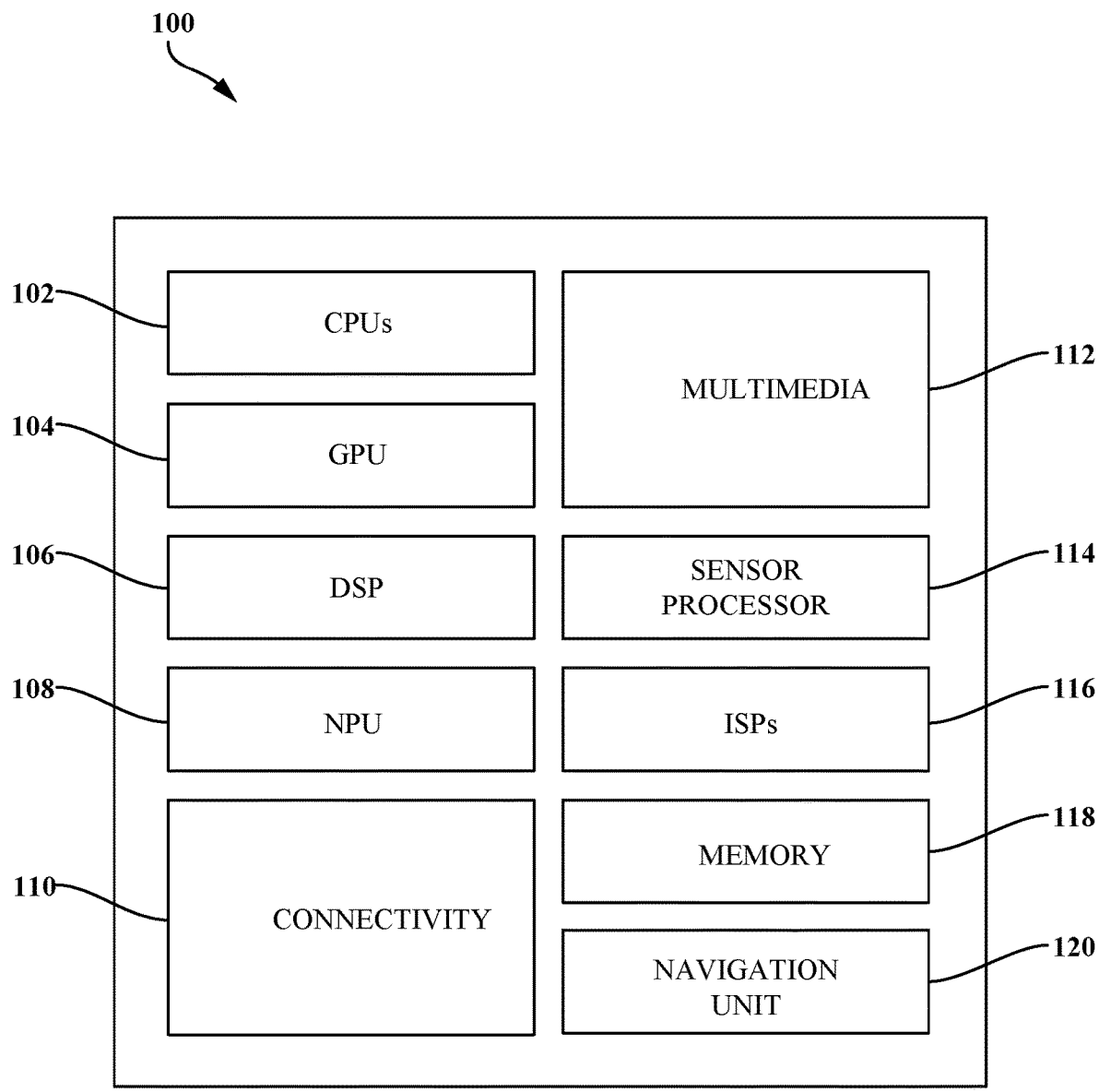
FIG. 1 illustrates an example implementation of designing a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The aspects described herein may be practiced at least partially by one or more neural networks, machine-learning models, artificial intelligence systems, reinforcement learning systems, and/or other similar computing system. Such a system may be referred to in the present disclosure as an "agent" or "smart assistant." It will be appreciated that these terms are not intended to be limiting, and are intended to be illustrative. For example, an "agent," as used herein may refer to a local system and/or interconnected system, such as one or more local sensors coupled with one or more processors that are remotely disposed to the sensor (e.g., cloud computing).

The present disclosure may provide an approach to registering and referencing one or more Internet-of-Things (IoT) devices. Registering an IoT device may include storing information associated with a device in an agent. For example, such information may include a unique identifier associated with an IoT device. In addition, registering an IoT device include identifying a communication link between the agent and the IoT device, e.g., so that the agent may communicate with IoT device. For example, an agent may obtain one or more images of a first location (e.g., a room). The agent may identify one or more objects within that first location. The agent may identify one or more of those objects that are IoT devices that the agent is operable to control. The agent may construct a spatial mapping that indicates the locations of each of the objects, e.g., relative to one another. In one aspect, the spatial mapping may be from a frame of reference.

Thereafter, the agent may be configured to receive input from a user (e.g., natural language input). The agent may identify, from the input, a set of attributes that describes one of the IoT devices and a command indicating how the IoT device is to be controlled. The agent may identify the IoT device based on the input set of attributes indicating a spatial relationship of the IoT device relative to one or more of the other objects in the first location. For example, the agent may identify the IoT device having a spatial relationship to one or more objects in the first location that matches the input describing a spatial relationship of the IoT device observed by the user. The agent may then control the identified IoT device in a manner that is consistent with the input command.

FIG. 1 illustrates an example implementation of the aforementioned registration and reference to IoT devices using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with at least one Neural Processing Unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU—e.g., one or more neural-processing functions may be performed by the CPU, DSP, and/or GPU. The SOC 100 may also include a sensor processor 114, image signal processors (ISPs), and/or navigation unit 120, which may include a global positioning system.

The SOC 100 may be based on an ARM instruction set. In an aspect of the present disclosure, the instructions loaded into the general-purpose processor 102 may include code to identify each object of a set of objects included in a first location, and the set of objects may include at least one IoT device and at least one other object. The instructions may include code to determine a first set of attributes for the at least one IoT device, and the first set of attributes may indicate a first spatial relationship between the at least one IoT device and the at least one other object. The instructions may include code to store registration information associated with the at least one IoT device, and the registration information may include a first identifier associated with the at least one IoT device and may include the first set of attributes for the at least one IoT device. The instructions may include code to obtain an input. The instructions may include code to determine whether the input corresponds to the at least one IoT device based on the registration information associated with the at least one IoT device. The instructions may include code to control the at least one IoT device when the input corresponds to the at least one IoT device.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Across various locations (e.g., homes, workplaces, etc.), IoT devices are increasingly ubiquitous. In some locations, various IoT devices may be communicatively coupled with a smart assistant or other hub that allows interaction with the various IoT devices. For example, a user may control a IoT device in the user's home using a smart assistant.

In order to refer to an IoT device, the IoT device may be referenced by an identifier (e.g., name), such as a name of the IoT device. However, remembering the identifier of the IoT device, e.g., when issuing a voice command, may be cumbersome and frustrate the user. For example, IoT devices are frequently associated with ad-hoc and/or non-intuitive identifiers or names, which may frustrate the user experience.

In view of the foregoing, a needed exists for an intuitive way to refer to IoT devices without having to necessarily remember specific identifiers for the IoT devices. Rather, each IoT device may be referenced in natural manner that improves user experience. For example, the present disclosure may present an intuitive way to reference IoT devices using voice commands in an environment with a smart assistant or other agent, e.g., by leveraging vision and other sensory modalities. Accordingly, a user can issue commands to an IoT device without knowing the exact identifier assigned to that IoT device.

Figure 2:
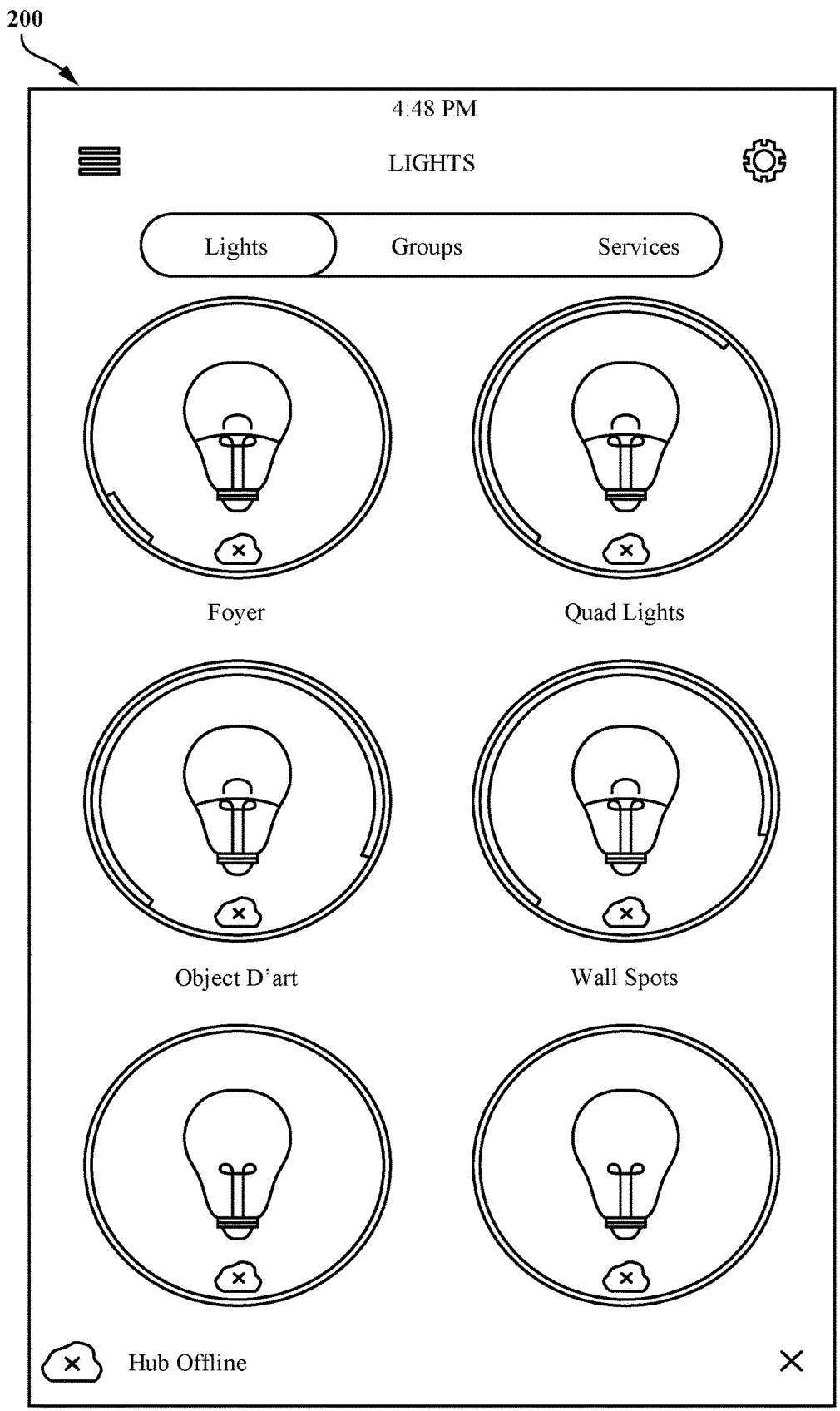
FIG. 2 is a block diagram illustrating various Internet-of-Things (IoT) devices referenced on a visual display associated with an agent, in accordance with aspects of the present disclosure.

FIG. 2 illustrates a block diagram of a plurality of IoT devices that are referenced on a visual display 200 associated with an agent. For example, the visual display 200 may present a visual reference to a plurality of IoT devices that may be controlled through the agent. Illustratively, the agent may receive input from a user through the visual display (e.g., touchscreen) in order to control one or more IoT devices, such as one or more light fixtures disposed in various locations. The agent may control the one or more light fixtures in a manner that is consistent with input received through the visual display 200. However, this approach may limit the scope of the agent. That is, the one or more IoT devices referenced on the visual display 200 may only be controlled by the agent through the input received through the visual display. The visual display 200 illustrates one example of an approach to receiving input, and the agent may receive input through one or more other approaches, e.g., including textual input and/or speech input (e.g., natural language input).

In aspects, the agent may include one or more different mechanisms that allow the agent to receive various input from different sources (e.g., one or more microphones). In order to intelligently control the one or more IoT devices, the agent may identify (e.g., learn) one or more attributes of the one or more IoT devices. When the agent receives input, the agent may intelligently match one or more attributes (e.g., spatial attributes) to one or more attributes of an IoT device based on a spatial mapping of a location. Further based on the input, the agent may then control the IoT device matching the set of input attributes, as described herein.

Figure 3:
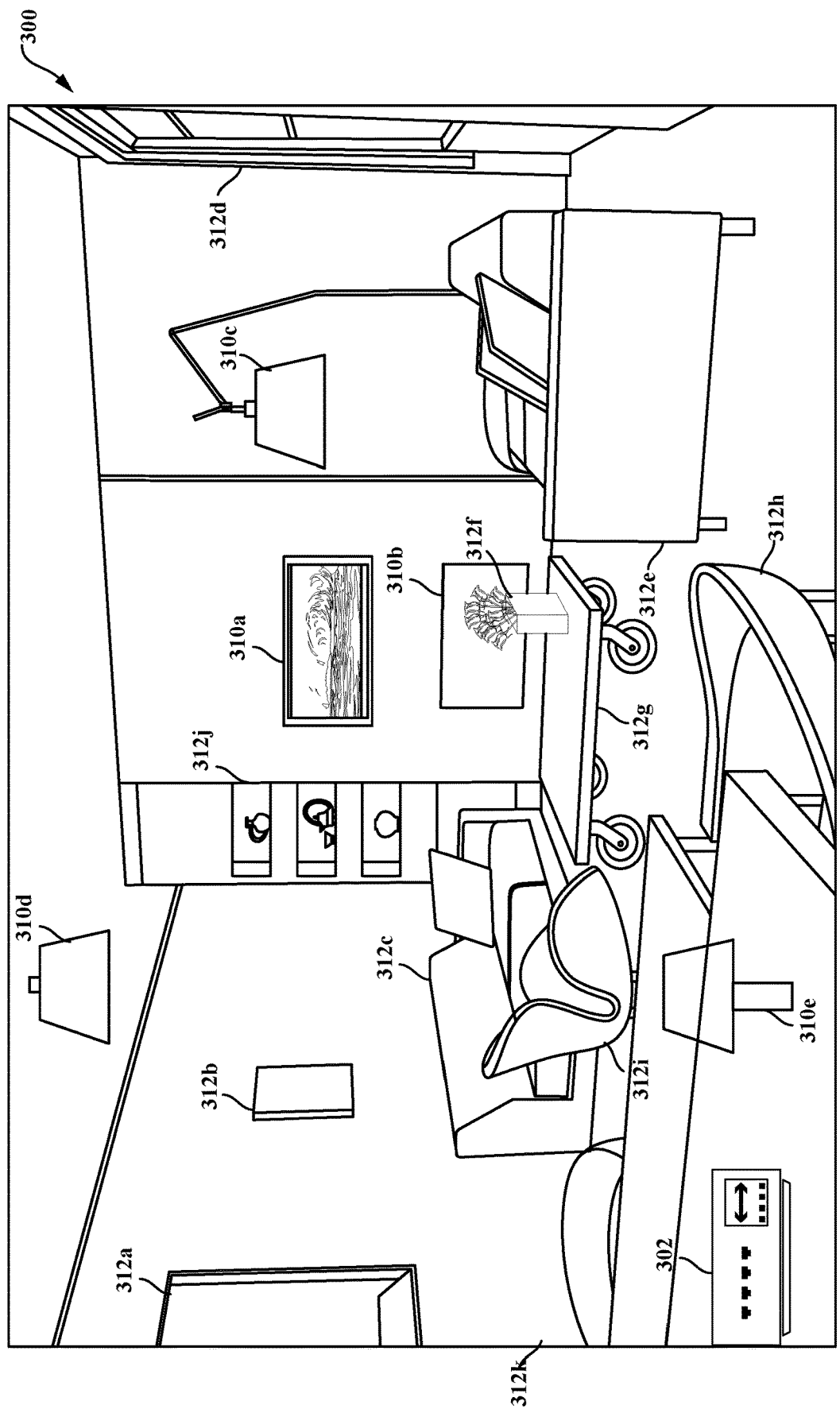
FIG. 3 is a block diagram illustrating a location that includes one or more IoT devices that are spatially related to one or more objects present at a location, in accordance with aspects of the present disclosure.

FIG. 3 is a block diagram illustrating a location 300 that includes a set of objects, in accordance with various aspects of the present disclosure. FIG. 3 illustrates an agent 302. The agent 302 may include one or more neural networks, machine-learning models, artificial intelligence systems, reinforcement learning systems, word embedding models, natural language processing (NLP) models, and/or other similar computing systems. In one aspect, the agent 302 may be included in a virtual assistant, an intelligent personal assistant, and/or another computing agent. With references to FIG. 1, the agent 302 may include and/or may be communicatively coupled with the SoC 100.

While FIG. 3 illustrates the agent 302 as disposed in the location 300, aspects of the present invention may be practiced when the agent 302 is absent from the location 300. For example, the agent 302 may be located in another room that is different from the location 300. In another aspect, the agent 302 may be communicatively coupled with a sensor (e.g., a microphone and/or camera) that is located in the location 300, while the agent 302 is remotely located (e.g., in the cloud or other remote server).

The location 300 may include a set of objects 310a-e, 312a-k. The set of objects 310a-e, 312a-k may include a set of IoT devices 310a-e. By way of example, the set of IoT devices 310a-e may include a television 310a, a fireplace 310b (e.g., electronic fireplace), a first light 310c (e.g., a floor lamp), a second light 310d (e.g., a foyer light), and a third light 310e (e.g., a desk light). The set of IoT devices 310a-e may be referenced by an individual using natural language, e.g., "turn on the floor lamp," "turn on the foyer light," and/or "turn on the desk light." The present disclosure comprehends any number of IoT devices, such as a faucet, refrigerator, oven, stove, media center, speaker system, gaming console, coffee machine, blender, microwave, thermostat, security system, camera, detector (e.g., smoke and/or carbon monoxide detector), sensor, or essentially any other device capable of communicating though a network (e.g., wireless local area network (WLAN), WiFi, etc.), such as the Internet. In an aspect, the agent 302 may be communicatively coupled with the IoT devices 310a-e, e.g., through a network.

In one aspect, the agent 302 may register or store information associated with a respective identifier for each IoT device 310a-e. The agent 302 may refer to a respective one of the IoT devices 310a-e via the respective identifier. For example, when the agent 302 issues a command to the television 310a, the agent 302 may send a message over a network, and the message may include a respective identifier that is associated with the television 310a and indicates that the command is intended for the television 310a.

The set of objects 310a-e, 312a-k may further include a set of non-IoT objects 312a-k. By way of example, the set of non-IoT objects 312a-k may include a first painting 312a, a second painting 312b, a first couch 312c, a window 312d, a second couch 312e, a vase with flowers 312f, a coffee table 312g, a first chair 312h, a second chair 312i, a set of pots 312j, and/or a first wall 312k.

Figure 4:
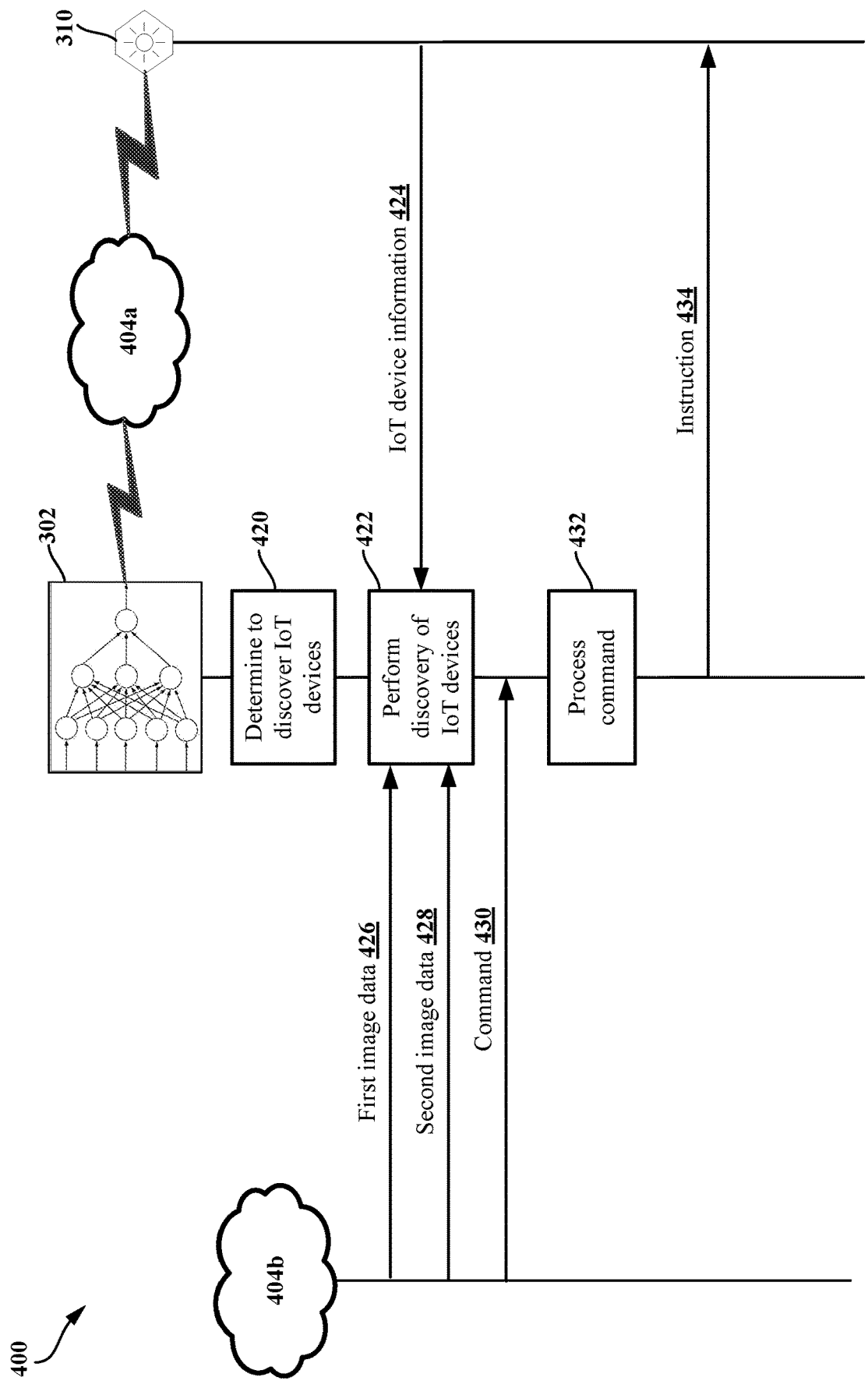
FIG. 4 is a call flow diagram illustrating a method of discovering and controlling IoT devices, in accordance with aspects of the present disclosure.

FIG. 4 is a call flow diagram illustrating a method 400 of operating an agent, in accordance with various aspects. The agent 302 may determine 420 to discover one or more of the IoT devices 310a-e present in the location 300. In one aspect, the agent 302 may determine 420 to discover the one or more IoT devices 310a-e by obtaining a prompt, such as a user input (e.g., via speech input, via a device that may communicate with the agent 302, via the agent directly, etc.). In another aspect, the agent 302 may automatically determine 420 to discover the one or more IoT devices 310a-e.

Based on the determination 420 to discover the IoT devices 310a-e, the agent may perform 422 discovery of IoT devices 310a-e in order to determine the IoT devices 310a-e that are available at the location 300. For example, the agent 302 and the IoT devices 310a-e may be connected with one network 404a (e.g., WiFi network or another wireless network). The IoT devices 310a-e may send respective information (e.g., a respective identifier and/or other identifying information, such as attributes) over the first network 404a, and the agent 302 may obtain the respective identifiers for each of the IoT devices 310a-e. For example, the agent 302 may receive IoT device information 424 from the first light 310c, which may indicate an identifier associated with the first light 310c.

The agent 302 may store the respective identifiers for each of the IoT devices 310a-e. Further, if provided other information from one or more of the IoT devices 310a-e, the agent 302 may store this other information in association with the corresponding identifier. For example, the agent 302 may store the type of IoT device, the capabilities of the IoT device, and/or any other information that the agent 302 may obtain. In some aspects, the agent 302 may perform additional processing when storing respective identifiers and/or corresponding information for one or more of the IoT devices 310a-e. For example, the agent 302 may categorize one or more of the IoT devices 310a-e—e.g., the IoT devices 310c-e may be categorized as "lights."

In one aspect, during performance 422 of the discovery, the agent 302 may associate one or more respective visual attributes with each of the IoT devices 310a-e. For example, the agent 302 may obtain first image data 426, which may represent the location 300 and include representations of each of the IoT devices 310a-e. The first image data 426 may be a still image or a moving image.

The agent 302 may store respective attributes corresponding to each of the IoT devices 310a-e, such as visual and/or spatial attributes. For example, the agent 302 may store a set of attributes corresponding to an identifier for one IoT device that indicates that an IoT device is a television 310a, and the set of attributes may indicate that the television 310a is above a fireplace 310b. In another example, the agent 302 may store a set of attributes corresponding to an identifier for one IoT device that indicates that an IoT device is a light 310c, and the set of attributes may indicate that the light 310c is to the left of the couch 312e and/or that the light 310c is blue in color. The agent 302 may categorize the sets of attributes corresponding to each of the IoT devices 310a-e, e.g., in order to categorize the lights 310c-e as a group with the capability of turning on/off a light.

In one aspect of the performance 422 of discovery, the agent 302 may obtain second image data 428 (e.g., a still image or moving image) that represents the location 300 including the IoT devices 310a-e. For example, the agent 302 may obtain the first image data 426 and wait a time period (e.g., predetermined time period) before obtaining the second image data 428. In one aspect, the agent 302 may obtain the second image data 428 based on a change to a state of at least one of the IoT devices 310a-e. For example, the agent 302 may obtain the second image data 428 responsive to a message from the first light 310c indicating that the first light 310c has changed state (e.g., from an "off" state to an "on" state, or vice versa). In another aspect, the agent 302 may cause the change of state to the at least one of the IoT devices 310a-e, e.g., by sending a command to the first light 310c that includes an identifier associated with the first light 310c and instructs the first light 310c to change state (e.g., power on). The agent 302 may obtain the second image data 428 based on causing the state change. For example, the agent 302 may issue a command to the first light 310c indicating that the first light 310c is to change state (e.g., from an "off" state to an "on" state, or vice versa).

In an aspect, the agent 302 may compare the first image data 426 to the second image data 428 in order to detect one or more differences. For example, the agent 302 may determine that the first light 310c is now in an "on" state based on the difference between the first image data 426 (representing the first light 310c in an "off" state) and the second image data 428 (representing the first light 310c in an "on" state). The agent 302 may determine that an identifier of the first light 310c (e.g., included in a command to change the state of the first light 310c) corresponds to the representation of the first light 310c in the first image data 426 and/or the second image data 428. That is, the agent 302 may compare the second image data 428 to the first image data 426 in order to identify a difference between the second image data 428 and the first image data 426, and to identify the first light 310c (e.g., associated with an identifier) that corresponds to the IoT device represented with the identified difference (e.g., the first light 310c is powered off in the first image data 426 but powered on in the second image data 428 may be identified).

Based on the identified differences, the agent 302 may determine correspondence between a detected object and an IoT device. For example, the agent 302 may identify the first light 310c from the first image data 426. Thereafter, the agent 302 may detect a state change (e.g., powering on) of the first light 310c. The agent 302 may compare the first image data 426 to second image data 428 in order to detect that an object identified as a light experienced a state change and, therefore, is the first light 310c. In one aspect, the agent 302 may identify a first identifier that is associated with the first light 310c and the agent 302 may register or store information indicating a correspondence between the first light 310c represented in the location 300 and the first identifier (e.g., the first identifier corresponding to the first light 310c may be used to communicate with (e.g., control) the first light 310c).

In one aspect, the agent 302 may store information that associates the visual representation of the first light 310c (e.g., in the first image data 426 and/or second image data 428) with the first identifier, such as the set of visual and/or spatial attributes/relationships (e.g., a position of the first light 310c in the location 300, a position of the first light 310c relative to one or more other IoT devices 310a-b, 310d-e and/or relative to one or more objects 312a-k, a color of the first light 310c, relative size of the first light 310c, etc.). Accordingly, the agent 302 may be configured to discover each IoT device of the set of IoT devices 310a-e over time as each IoT device of the set of IoT devices 310a-e experiences a respective state change.

In one aspect, the agent 302 may obtain the first image data 426 and/or the second image data 428 via an IoT device that is a camera communicatively coupled with the agent 302. For example, the agent 302 may be communicatively coupled with the camera over a second network 404b, which may be a wired or wireless network (e.g., Bluetooth or other personal area network (PAN), WiFi network, etc.) (n.b., the first network 404a may be the same network as the second network 404b). The agent 302 may automatically obtain the first image data 426 and/or the second image data 428—e.g., the agent 302 may automatically issue a command over the second network 404b to the camera to capture the second image data 428 based on a state change to one of the IoT devices 310a-e.

In another aspect, the agent 302 may obtain the first image data 426 and/or the second image data 428 based on user input. For example, the agent 302 may communicate over the second network 404b with a personal device (e.g., smart phone, tablet computer, etc.) of the user and/or one of the IoT devices 310a-e having the capability of outputting a prompt (e.g., the television 310a may output an audio prompt or visual prompt). The agent 302 may send a message over the second network 404b to the personal device prompting the user to capture image data representing the location 300, and the personal device may send the image data to the agent 302 over the first network 404a. The agent 302 may send the message to the personal device based on a state change to one of the IoT devices 310a-e, e.g., prompting the user to capture the second image data 428 so that the agent 302 may identify differences between the first image data 426 and the second image data 428. In another example, the agent 302 may output a prompt to capture the first and/or second image data 426, 428, such as an audio prompt, from a speaker communicatively coupled with the agent 302 (e.g., an IoT speaker, a speaker integrated in the housing of the agent 302).

In one aspect, the agent 302 may systematically cause state changes to a plurality of IoT devices from which the agent 302 has obtained information (e.g., respective identifiers of each of the IoT devices 310a-e, which may be obtained via respective messages communicated over the first network 404a). For example, the agent 302 may iterate through a list of each of the IoT device from which the agent 302 has obtained information (e.g., the agent 302 may receive respective identifiers from each of the IoT devices 310a-e over the first network 404a), obtaining a new image after each iteration (e.g., the second image data 428). Therefore, the agent 302 may discover and catalog each IoT device with which the agent 302 may communicate, such as by cataloging a respective location associated with each of the IoT devices 310a-e.

When at least one of the IoT devices 310a-e is discovered by the agent 302, the agent 302 may monitor for commands directed to one of the IoT devices 310a-e. In one aspect, the agent 302 may receive a command 430 via a microphone. The command 430 may be a speech input, such as a natural language input. In another aspect, the command 430 may be written or obtained via a message, such as a written command or other message obtained from a personal device of a user and communicated to the agent 302 over the first network 404a.

The agent 302 may process 432 the command 430 to determine which of the IoT devices 310a-e is referenced by the command 430. The agent 302 may process 432 to the command 430 to determine an input set of attributes describing one of the IoT devices 310a-e. For example, the command 430 may indicate "turn on the light to the left of the couch." The agent 302 may process the command 430 to identify an input set of attributes indicating a type of IoT device (e.g., a light) and a relative position of the IoT device (e.g., to the left of the couch). The agent 302 may compare the input set of attributes to stored sets of attributes in order to determine that the command 430 references the first light 310c. For example, the agent 302 may determine that the type of device is a light, and the agent 302 may retrieve sets of attributes for the category light. The agent 302 may determine that the type of device that is a light and is to the left of the couch corresponds to the first light 310c. Further, the agent 302 may process 432 the command 430 to determine that the first light 310c is to be controlled so that the state of the first light 310c is turned to "on." Accordingly, the agent 302 may send an instruction 434 over the first network 404a to the first light 310c, and the instruction 434 may cause the first light 310c to change state to "on." The agent 302 may identify and control other IoT devices 310a-b, d-e in an approach similar to that described herein with respect to the first light 310c.

In an aspect, the agent 302 may periodically "refresh" all or a portion of the information corresponding to one or more of the IoT devices 310a-e with which the agent 302 may communicate (e.g., the agent 302 may update one or more sets of attributes corresponding to one or more of the IoT devices 310a-e). That is, the agent 302 may be configured to determine 420 to discover the IoT devices 310a-e according to a predetermined time period. For example, the agent 302 may determine 420 to discover the IoT devices 310a-e after every twenty-four hour time period, after every week, and/or after another time period. In one aspect, the agent 302 may determine 420 to discover IoT devices 310a-e based on an event. For example, the agent 302 may be unable to decode a message received from an IoT device over the first network 404a—e.g., the command 430 may indicate "turn on the light over the red sofa" when the red sofa is newly placed in the location 300 and the agent 302 has yet to identify the red sofa in the location 300. In further examples of events that may trigger the "refresh" by the agent 302, the agent 302 may be unable to identify an IoT device from which a message is received over the first network 404a, the agent 302 may detect that an IoT device has moved based on the first image data 426 and/or the second image data 428, the agent 302 may receive a message over the first network 404a from an IoT device that the agent 302 has not yet registered, or another similar event.

Figure 5:
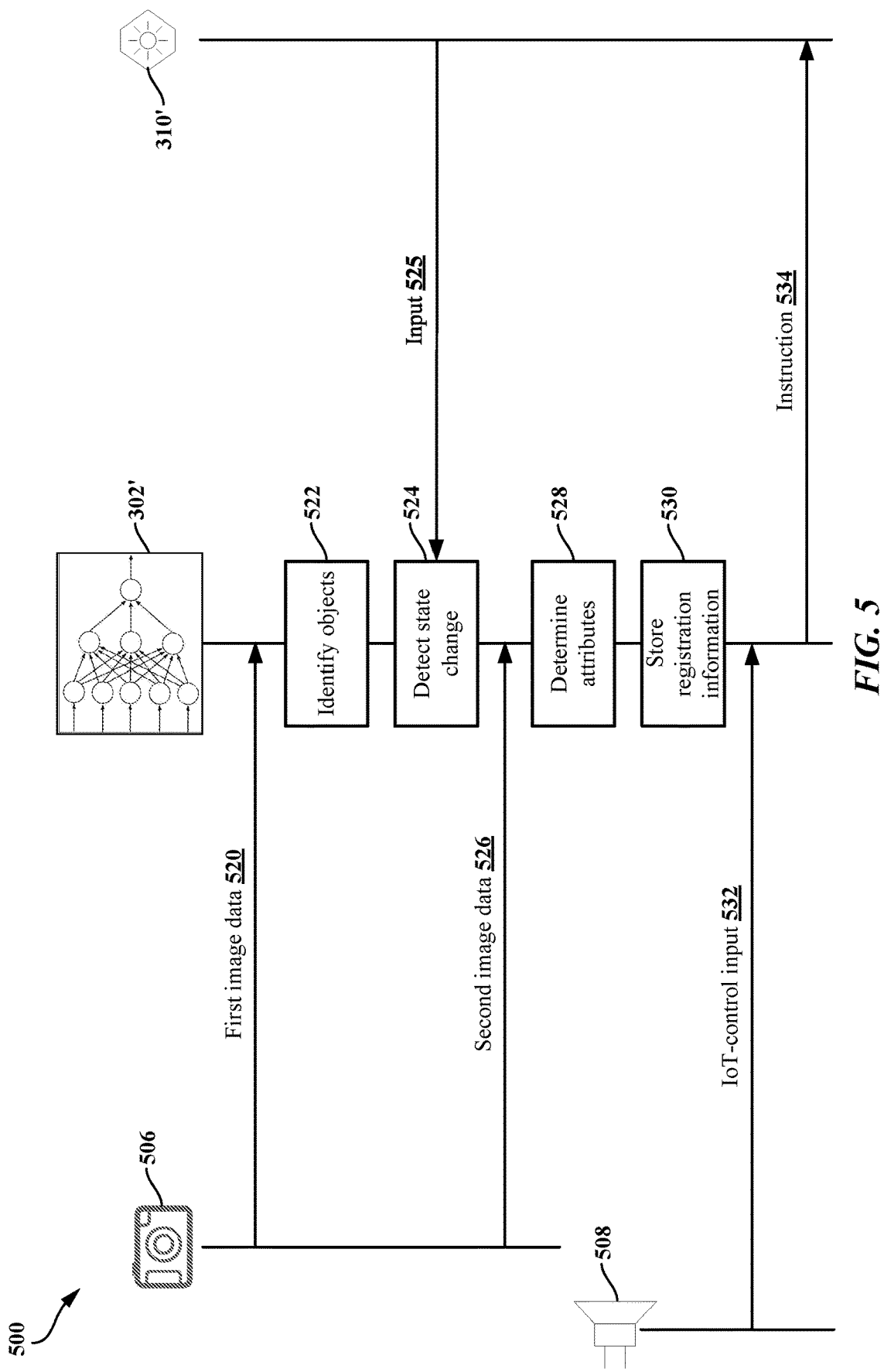
FIG. 5 is a call flow diagram illustrating an example of one method of registering and referencing IoT devices, in accordance with aspects of the present disclosure.

FIG. 5 is a call flow diagram illustrating a method 500 of operating an agent, in accordance with various aspects. The method 500 illustrates one aspect of discovery and controlling IoT devices. For example, the method 500 may be a specific aspect of the method 400. Accordingly, the agent 302' may be an aspect of the agent 302 of FIGS. 3 and 4. The IoT device 310' may be an aspect of one of the IoT devices 310a-e illustrated in FIGS. 3 and 4, such as the television 310a, the fireplace 310b, one of the lights 310c-e, or another IoT device.

In various aspects, the agent 302' may include and/or may be communicatively coupled with a camera 506 that is configured to capture image data (e.g., static images, video, etc.). Further, the agent 302' may include and/or may be communicatively coupled with a microphone 508. In one aspect, the camera 506 and/or the microphone 508 may be located on a personal device (e.g., smartphone) of a user, a smart speaker, and/or another virtual assistant.

In various aspects, the agent 302' may be configured to obtain first image data 520 representing the location 300 that includes the set of IoT devices 310a-e (310') and the set of non-IoT objects 312a-k. For example, the agent 302 may include and/or may be communicatively coupled with one or more cameras (e.g., Internet Protocol (IP) cameras, the camera 506, etc.). In one aspect, the agent 302' may obtain the first image data 520 from a user. For example, the agent 302' may receive a wireless transmission from a smartphone or other personal device of the user, and the wireless transmission may include the first image data 520. In various aspect, the first image data 520 may be a static image at least partially representing the location 300, a video recording at least partially representing the location 300, a moving image at least partially representing the location 300, or another type of data that represents a visual depiction of the location 300.

In various aspects, the agent 302' may identify 522 the set of objects 310a-e (310'), 312a-k in the location 300. The agent 302' may include a DNN and/or other machine-learning model. For example, agent 302' may include one or more reinforcement-learning models, a CNN, an RNN, or another object-detection system. In one aspect, the agent 302' may include one or more neural networks that implement a Single Shot Multibox Detector (SSD) and/or You Only Look Once (YOLO) for object detection (e.g., real-time object detection). In one aspect, the agent 302' may identify each object of the set of objects 310a-e (310'), 312a-k in the location 300 by processing the first image data 520 using a DNN or other model/neural network. The agent 302' may obtain the output of the processing in which each object of the set of objects 310a-e (310'), 312a-k is identified.

In one aspect, one or more of the IoT devices 310a-e may send (e.g., broadcast) information identifying the one or more IoT devices 310a-e. For example, the first light 310c may broadcast an identifier and/or other information associated with the first light 310c (e.g., information indicating capabilities, type of device, information indicating a change in state of the first light 310c, etc.).

In one aspect, the agent 302' may detect 524 a state change to a first IoT device 310'. For example, the agent 302' may detect that the first IoT device 310' is powered on or that the first IoT device 310' has received information (e.g., via input from a user, via information transmitted by the first IoT device 310' to the agent 302', etc.) associated with the first IoT device 310'. For example, the received information may indicate that the first IoT device 310' is now in a powered-on state (e.g., "the first light is now on" received via user input, via information transmitted by the first light 310c indicating that the first light 310c is now on, etc.). The agent 302' may obtain second image data 526 representing the location 300. In an aspect, the agent 302' may compare the first image data 520 to the second image data 526 in order to detect one or more differences (e.g., a light that is powered on, a faucet that is now running water, etc.). For example, the agent 302' may determine that the first light 310c is now on based on the difference between the first image data 520 and the second image data 526, and the agent 302' may determine that the received information corresponds to the first light 310c.

In one aspect, the agent 302' may obtain the second image data 526 based on the detected state change. For example, the agent 302' may cause a camera to capture an image of the location 300 in order to compare that image to the first image data 520. In one aspect, the agent 302' may be configured to cause a state change to an IoT device 310', e.g., after the first image data 520 is processed and before the second image data 526 is processed. For example, agent 302' may receive a communication from the IoT device 310' indicating information associated with the IoT device 310', such as an identifier of the IoT device 310', a type of the IoT device 310', etc. The agent 302' may capture the second image data 526, and then the agent 302' may send a command to the IoT device 310' causing the state change to the IoT device 310' (e.g., a command to cause the IoT device 310' to power on). The agent 302' may then capture the second image data 526. The agent 302' may compare the second image data 526 to the first image data 520 in order to identify a difference between the second image data 526 and the first image data 520, and to identify the IoT device 310' that corresponds to the identified difference (e.g., a light 310c that is powered off in the first image data 520 but powered on in the second image data 526 may be identified). Based on identifying the IoT device 310', the agent 302' may store a correlation between the information associated with the IoT device 310' (e.g., an identifier associated with the IoT device 310') and one or more attributes of the IoT device 310', which may be derived from the first image data 520 and/or the second image data 526 (e.g., a position of the IoT device 310' in a room, a color of the IoT device 310', relative size of the IoT device 310', etc.).

In one aspect, the agent 302' may systematically cause state changes to a plurality of IoT devices (including the IoT device 310') from which the agent 302' has obtained information (e.g., respective identifiers of each of the IoT devices). For example, the agent 302' may iterate through a list of each of the IoT device from which the agent 302' has obtained information, capturing a new image after each iteration (e.g., the second image data 526). Therefore, the agent 302' may catalog each IoT device with which the agent 302' may communicate.

Based on the detected differences, the agent 302' may determine correspondence between a detected object and an IoT device. For example, the agent 302' may identify the first IoT device 310' as a television 310*a* from the first image data 520. Thereafter, the agent 302' may detect a state change (e.g., powering on) of the first IoT device 310'. The agent 302' may compare the first image data 520 to second image data 526 in order to detect that object identified as the television experienced the state change and, therefore, is the first IoT device 310'. Further, the agent 302' may receive information (e.g., via input from a user) indicating that the television 310*a* has changed state (e.g., been powered on). The agent 302' may compare the first image data 520 to the second image data 526 to determine that the television 310*a* has changed state between the first image data 520 and the second image data 526, and therefore, the television 310*a* is the first IoT device 310' that is referenced (e.g., via user input).

The agent 302' may identify a first identifier that is associated with the first IoT device 310' and the agent 302' may register or store information indicating a correspondence between the first IoT device 310' present in the location 300 (and represented in the first image data 520 and/or second image data 526) and a first identifier that may be used to communicate with (e.g., control) the first IoT device 310'. For example, the agent 302' may store information that associates the visual representation of the first IoT device 310' (e.g., in the first image data 520 and/or second image data 526) with the first identifier. Accordingly, the agent 302' may be configured to automatically discovery each IoT device of the set of IoT devices 310*a-e* (310') over time as each IoT device of the set of IoT devices 310*a-e* (310') experiences a respective state change.

In one aspect, the agent 302' may receive input from a user in order to identify correspondence between the visual representation of first IoT device 310' (e.g., represented in the first image data 520 and/or second image data 526) and the first identifier associated with the first IoT device 310'. For example, the agent 302' may receive a first input associated with the first IoT device 310' following the state change to the first IoT device 310'. In one aspect, the agent 302' may prompt the user for the first input in order to identify the first IoT device 310' after the state change so that the agent 302' may identify the first IoT device 310' in the first image data 520 and/or second image data 526.

In one aspect, the agent 302' may receive input from the first IoT device 310' in order to identify correspondence between the visual representation of first IoT device 310' (e.g., represented in the first image data 520 and/or second image data 526) and the first identifier associated with the first IoT device 310'. For example, the agent 302' may receive a first input 525 associated with the first IoT device 310' following the state change to the first IoT device 310'. For example, the agent 302' may receive a first input 525 from the first IoT device 310' indicating that the first IoT device 310' has transitioned to a powered-on state, and the agent 302' may identify the first IoT device 310' in the first image data 520 and/or second image data 526.

Accordingly, the agent 302' may identify the first IoT device 310' based on the received first input. In one aspect, the agent 302' may receive the first input via tactile or visual input. For example, the agent 302' may detect that the user is touching or pointing to the first IoT device 310' (e.g., based on image data captured through the camera 506). In another aspect, the agent 302' may receive the first input as speech input. For example, the agent 302' may receive (e.g., through the microphone 508 and/or directly through the agent 302') a description of the first IoT device 310', such as a natural language input describing the first IoT device 310'. In another aspect, the agent 302' may receive the first input as text input, such as directly through the agent 302' and/or through a smartphone or other personal device of the user).

Based on the first input, the agent 302' may correlate the first IoT device 310' indicated by the first input with a first identifier associated with the first IoT device 310'. For example, the agent 302' may store information that associates the visual representation of the first IoT device 310' (e.g., in the first image data 520 and/or second image data 526) with the first identifier. Accordingly, the agent 302' may register or store information indicating a correspondence between the first IoT device 310' present in the location 300 (and represented in the first image data 520 and/or second image data 526) and a first identifier that may be used to communicate with (e.g., control) the first IoT device 310'.

In one aspect, the agent 302' may correlate the first IoT device 310' with a first identifier based on Simultaneous Localization and Mapping (SLAM). For example, a user may walk around the location 300 (e.g., with a smartphone) and describe the IoT devices 310*a-e*. The microphone 508 may receive the user's speech and provide that speech to the agent 302'. The agent 302' may obtain the user's position (e.g., based on smartphone position, another sensor, and/or image data) and identify the IoT device of the IoT devices 310*a-e* to which the user is referring in the speech obtained from the microphone 508. Accordingly, the agent 302' may register or store information indicating a correspondence between the first IoT device 310' present in the location 300 (and represented in the first image data 520 and/or second image data 526) and a first identifier that may be used to communicate with (e.g., control) the first IoT device 310'.

Based on the correspondence between the detected object and an IoT device, the agent 302' may determine 528 a set of attributes for each IoT device 310*a-e* (310'). The set of attributes for each IoT device of the set of IoT devices 310*a-e* (310') may indicate at least one spatial relationship between a respective IoT device of the set of IoT devices 310*a-e* (310') and at least one other object of the set of objects 310*a-e* (310'), 312*a-k*.

Illustratively, the agent 302' may determine 528 a first set of attributes for the first IoT device 310'. The first set of attributes may indicate a spatial relationship between the first IoT device 310' and at least one other object of the set of objects 310*a-e* (310'), 312*a-k*. For example, the first set of attributes may indicate that the first IoT device 310' is a television 310*a* that is above a fireplace 310*b*. In another example, the first set of attributes may indicate that the first IoT device 310' is the television 310*a* that is to the left of the light 310*c*. In another example, the first set of attributes may indicate that the first IoT device 310' is the television 310*a* that is to the right of the pots 312*j*. In another example, the first set of attributes may indicate that the first IoT device 310' is the television 310*a* that is behind the coffee table 312*g*.

The agent 302' may determine 528 a set of attributes for each IoT device of the set of IoT devices 310a-e (310'). In one aspect, the agent 302 may construct a spatial mapping that indicates the respective locations of each object of the set of objects 310a-e (310'), 312a-k disposed through the location 300. In one aspect, the spatial mapping may indicate coordinates, distances, and/or vectors of each object of the set of objects 310a-e (310'), 312a-k.

In one aspect, the agent 302' may be configured to dynamically refer to and/or adjust the spatial mapping based on a frame of reference. For example, the agent 302' may construct a spatial mapping based on the first image data 520 and/or second image data 526. However, the agent 302' may dynamically refer to and/or adjust the spatial mapping based on a frame of reference that is different from the frame(s) of reference captured in the first image data 520 and/or second image data 526. The agent 302' may determine one or more spatial attributes of the first IoT device 310' based on the frame of reference. For example, the one or more spatial attributes of the first IoT device 310' may be dynamically determined and/or updated based on the frame of reference.

In one aspect, the agent 302' may determine the frame of reference based on information indicating a position of a smartphone of a user (e.g., through WiFi positioning, PAN positioning, such as Bluetooth positioning, or another approach). The agent 302' may obtain (e.g., receive) information indicating the position of the smartphone, and the agent 302' may dynamically refer to and/or update the spatial mapping based on a frame of reference that is consistent with the detected smartphone. In another example, the agent 302' may receive image data (e.g., through the camera 506) and identify a position of the user in the location 300. Based on the position of the user, the agent 302' may dynamically refer to and/or update the spatial mapping based on a frame of reference that is consistent with the position of the user.

In one aspect, the set of attributes for each of the IoT devices 310a-e (310') may indicate other attributes in addition to the spatial attributes. For example, the first set of attributes for the first IoT device 310' may include a classification associated with the first IoT device 310'. A classification attribute may indicate a class or type of the first IoT device 310'. For example, the classification attribute may indicate that the first IoT device 310' is a television 310a, the classification attribute may indicate that the first IoT device 310' is a fireplace 310b, the classification attribute may indicate that the first IoT device 310' is a light 310c, etc.

In another example, the first set of attributes for the first IoT device 310' may include a visual attribute associated with the first IoT device 310'. A visual attribute may indicate one or more physical characteristics of the first IoT device 310'. For example, a visual attribute may indicate that the first IoT device 310' is a certain color (e.g., red, green, blue, etc.). In another example, a visual attribute may indicate that the first IoT device 310' is of a specific or relative size (e.g., a "big" television). In another example, a visual attribute may indicate that the first IoT device 310' includes one or more physical features (e.g., a light with a shade). In another example, a visual attribute may indicate that the first IoT device 310' is of a shape.

In another example, the first set of attributes for the first IoT device 310' may include a capability attribute associated with the first IoT device 310'. A capability attribute may indicate one or more capabilities of the first IoT device 310'. For example, a capability attribute may indicate one or more commands that the first IoT device 310' is capable of executing or performing. An example of a capability attribute may be that the first IoT device 310' is capable of powering on or off (e.g., when the first IoT device 310' is a television 310a or a light 310c). Another example of a capability attribute may be that the first IoT device 310' is capable of turning on or off a light (e.g., when the first IoT device 310' is a light 310c). Another example of a capability attribute may be that the first IoT device 310' is capable of setting a baking temperature to 400 degrees (e.g., when the first IoT device 310' is an oven). Another example of a capability attribute may be that the first IoT device 310' is capable of turning on or off a stream of water (e.g., when the first IoT device 310' is a faucet).

In one aspect, the agent 302' may store 530 (e.g., register) each IoT device 310a-e (310') in association with a respective set of attributes. For example, the agent 302' may store registration information that includes the first identifier associated with the first IoT device 310' and also include the first set of attributes for the first IoT device 310'. Accordingly, the agent 302' may register a respective identifier of a respective IoT device 310a-e (310') in memory (e.g., local or remote) in association with a respective set of attributes. Therefore, the agent 302' may identify a respective identifier of a respective IoT device 310a-e (310') based on a respective set of attributes in order to communicate with that respective IoT device 310a-e (310').

In various aspects, the agent 302' may control operation of each IoT device 310a-e (310') based on the registration information that includes a respective identifier associated with a respective IoT device 310a-e (310') and also includes a respective set of attributes for the at least one IoT device. For example, the agent 302' may obtain (e.g., receive) IoT-control input 532 that indicates an input set of attributes and also includes a command for an IoT device. The agent 302' may compare the input set of attributes to each set of attributes stored indicated in respective registration information, and the agent 302' may identify a registered first set of attributes that matches the input set of attributes. The agent 302' may consider a registered first set of attributes as matching the input set of attributes when the registered first set of attributes is approximately similar (e.g., within a threshold margin of error) and/or most closely matches (e.g., respective to other registered sets of attributes) the input set of attributes.

The agent 302' may then identify the respective identifier corresponding to the registered set of attributes that matches the input set of attributes. Based on the respective identifier, the agent 302' may control operation of the respective one of the IoT devices 310a-e (310') that corresponds to the respective identifier in accordance with the input command.

For example, the first IoT device 310' may be the first light 310c. The agent 302' may obtain (e.g., receive) IoT-control input 532 that indicates an input set of attributes for a "light" that is "to the left of the couch" and an input command to "adjust the brightness to be lower." Therefore, the input set of attributes may include a plurality of attributes, such as a spatial attribute, a classification attribute, a visual attribute, and/or a capability attribute.

The agent 302' may be configured to match each input attribute of the input set of attributes to a respective corresponding attribute of a registered set of attributes. For example, the agent 302' may match the input attribute "light" to a classification attribute of the first light 310c and may match the input attribute "to the left of the couch" to the spatial attribute indicating a relative position that is to the left of the couch 312e (e.g., from the user's perspective when the user is positioned in front of the couch 312e). The agent 302' may identify the first identifier that corresponds to the first light 310c. The agent 302' may then generate a message that indicates the input command (e.g., lower the brightness), and the agent 302' may provide the generated message to the first light 310c in order to cause the first light 310c to lower the brightness.

In one aspect, the agent 302' may obtain (e.g., receive) IoT-control input 532 as natural language input. For example, the microphone 508 may receive a natural language input from a user, and the agent 302' may obtain the natural language input from the microphone 508. The agent 302' may detect an input set of attributes and a input control operation from the natural language input.

In one aspect, the agent 302' may parse the natural language input using a DNN in order to identify the input set of attributes and the input control operation. In various aspects, the agent 302' may parse the natural language input using an NLP model, word embedding, and/or another language modeling or feature-identification technique.

From the input set of attributes, the agent 302' may identify an identifier of at least one IoT device. For example, the agent 302' may compare each input attribute of the input set of attributes to each corresponding first attribute of the first set of attributes associated with the first IoT device 310' (e.g., compare an input spatial attribute to a first spatial attribute of the first set of attributes, compare an input classification attribute to a first classification attribute of the first set of attributes, etc.). In one aspect, the agent 302' may use a DNN in order to compare or classify features associated with the input set of attributes, and the agent 302' may use feature comparison or classification of the DNN to compare or correspond to the first set of attributes. When the agent 302' determines that the first set of attributes matches the input set of attributes, the agent 302' may identify the first identifier associated with the first IoT device 310' (e.g., the agent 302' may store a mapping that indicates correspondence between the first set of attributes and the first identifier associated with the first IoT device 310').

The agent 302' may then control operation of the first IoT device 310' based on the identification of the first identifier and the input control operation. For example, the agent 302' may identify an operation or function of the first IoT device 310' that corresponds to the input control operation, such as powering on or off, changing channel, adjusting a lighting level, setting a temperature, etc.

Other various examples of input control operations include relative or contextual inputs. For example, the agent 302' may obtain an IoT-control input 532 that indicates the light 310c is to be balanced with the natural light through the window 312d behind the light 310c. The agent 302' may obtain (e.g., from an ambient-light sensor) a current lighting level, and the agent 302' may determine the level to which the light 310c is to be adjusted in order to be consistent with the current lighting level. In another example, the agent 302' may receive an IoT-control input 532 that indicates "turn on the light next to the couch on the left." The agent 302' may identify the couch 312e in the right of the location 300 (e.g., based on a frame of reference), and the agent 302' may then identify the light 310c next to the couch 312e on the right of the location 300.

The agent 302' may issue a command or instruction 534 to the first IoT device 310' to perform the identified operation or function. For example, the agent 302' may generate an instruction message 534 that includes the first identifier and the includes the command or instruction.

The agent 302' may send the generated instruction message 534 over the network for reception by the first IoT device 310'. The first IoT device 310' may receive the instruction message 534. Responsively, the first IoT device 310' may determine that the instruction message 534 is intended for the first IoT device 310' (e.g., by comparing the identifier of the first IoT device 310' to the identifier indicated in the instruction message 534). The first IoT device 310' may execute or perform the instruction indicated by the instruction message 534. For example, the first IoT device 310' may power on, change channels, adjust a lighting level, adjust a temperature, turn off, adjust a volume, or essentially any other function of which an IoT device is capable.

Figure 6:
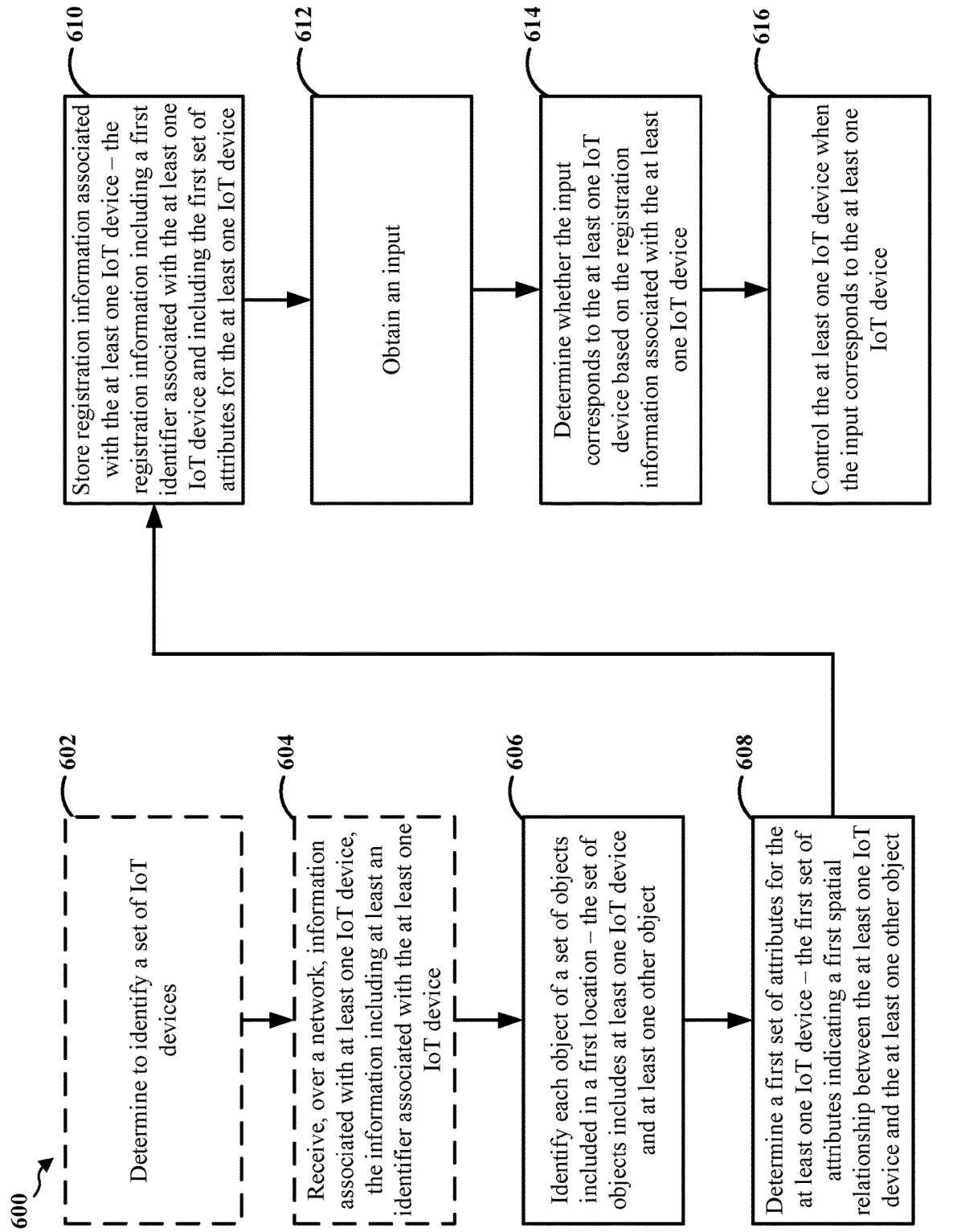
FIG. 6 is a flow diagram illustrating a method of discovering and controlling at least one IoT device, in accordance with aspects of the present disclosure.

FIG. 6 illustrates a method 600 of operating an agent in communication with at least one IoT device, in accordance with various aspects. The method may be practiced by an agent, such as the agent 302/302'. One or more of the illustrated operations may be transposed, omitted, and/or contemporaneously performed. Operations illustrated with dashed lines may be optional.

Beginning with operation 702, the agent may determine to identify a set of IoT devices. For example, the agent may obtain a prompt, such as a user input. The agent may determine to identify the set of IoT devices based on the prompt. In another aspect, the agent may determine to identify the set of IoT devices based on a time period. For example, the agent may periodically determine to identify the set of IoT devices after one day, after one week, and/or after another time period. In another aspect, the agent may determine to identify the set of IoT devices based on an event. For example, the agent may determine to identify the set of IoT devices when the agent is unable to decode a message received from an IoT device, when the agent receives a message from a new (e.g., unregistered) IoT device, when the agent detects an IoT device has moved (e.g., based on image data), and/or based on another event.

In the context of FIGS. 3-4, the agent 302 may determine 420 to discover one or more of the IoT devices 310a-e present in the location 300. In one aspect, the agent 302 may determine 420 to discover the one or more IoT devices 310a-e by obtaining a prompt, such as a user input (e.g., via speech input, via a device that may communicate with the agent 302, via the agent directly, etc.). In another aspect, the agent 302 may automatically determine 420 to discover the one or more IoT devices 310a-e. In the example illustrated in FIG. 5, the agent 302' may determine that the agent 302' is to identify 522 a set of objects, and the set of objects may include a set of IoT devices.

At operation 604, the agent may receive, over a network information associated with at least one IoT device of the set of IoT devices. For example, the agent may receive a message from an IoT device over a WiFi network, and the message may indicate an identifier associated with the IoT device. The agent may store the information in order to identify the IoT device. In the context of FIGS. 3-4, the agent 302 may receive the IoT device information 424 from the first light 310c, which may include an identifier associated with the first light 310c. In the example illustrated in FIG. 5, the agent 302' may receive information from the IoT device 310', and the received information may include an identifier associated with the IoT device 310'.

At operation 606, the agent may identify each object of a set of objects included in a first location. In an aspect, the set of objects may include at least one IoT device and at least one other object. For example, the agent may obtain first image data representing a location, and the agent may process the first image data using a neural network (e.g., a DNN). The neural network may process the first image data to generate at least one output, and the output may identify each object of the set of objects included in the first location represented by the first image data (e.g., the output may indicate a classification or category for each object of the set of objects, including the set of IoT devices). In the context of FIGS. 3-4, the agent 302 may perform 422 discovery of each object of the set of objects 310a-e, 312a-k included in the location 300 represented in the first image data 426. In the example illustrated in FIG. 5, the agent 302' may identify 522 objects included in the first image data 520 representing the location 300.

At operation 608, the agent may determine a first set of attributes for the at least one IoT device. In aspects, the first set of attributes may indicate visual and/or spatial attributes (e.g., relationship(s)) between the at least one IoT device and the at least one other object. In one aspect, the spatial relationship may be based on the identified frame of reference. In one aspect, the agent may construct a spatial mapping that represents that at least one IoT device relative to the at least one other object in the first location. The agent may further determine one or more other attributes of the at least one IoT device (e.g., a classification attribute, a visual attribute, a capability attribute, etc.).

In an aspect, the agent may determine the first set of attributes for the at least one IoT device based on image data (e.g., first image data and the second image data, moving image data, etc.). For example, the agent may detect a state change to the at least one IoT device, and the agent may identify the identifier of the at least one IoT device that underwent the state change. The agent may compare the first image data to the second image data to determine the at least one IoT device that is different between the first image data and the second image data after the state change, and the agent may infer that the identifier corresponds to the at least one IoT device that is different between the first image data and the second image data.

In another aspect, the agent may determine the first set of attributes based on the first input (e.g., user input) associated with the at least one IoT device. For example, the agent may detect the state change to the at least one IoT device, and the agent may identify the identifier of the at least one IoT device that underwent the state change. The agent may receive the first input describing the at least one IoT device (e.g., through a microphone or camera), e.g., after the state change, and the agent may infer that the identifier corresponds to the at least one IoT device that is described by the first input.

In the context of FIGS. 3-4, the agent 302 may perform 422 discovery of IoT devices, including identifying a first set of attributes for the first light 310c. The first set of attributes may indicate visual and/or spatial relationship between the first light 310c and at least one other object of the set of objects (e.g., the IoT devices 310a-b, 310d-e and/or the non-IoT objects 312a-k). For example, the agent 302 may determine that a first set of attributes for the first light 310c, and the first set of attributes may indicate a classification attribute of "light" and a spatial relationship indicating to the left of the couch, in front of the window, etc. In the example illustrated in FIG. 5, the agent 302' may determine 528 attributes of the IoT device 310', and the first set of attributes may indicate a spatial relationship between the first IoT device 310' and at least one other object of the set of objects 310a-e, 312a-k. For example, the agent 302/302' may determine that a first set of attributes for the television 310a, and the first set of attributes may indicate a classification attribute of "television" and a spatial relationship indicating above the fireplace, on a rear wall, to the right of the pots, etc At operation 610, the agent may store registration information that includes the first identifier associated with the at least one IoT device and the first set of attributes. For example, the agent may store the first set of attributes, and the agent may store information indicating a correspondence between the first set of attributes and the first identifier for the at least one IoT device. In the context of FIGS. 3-4, the agent 302 may perform 422 discovery of the IoT devices 310a-e, including storing registration information that includes a first identifier associated with the first light 310c and includes the first set of attributes for the first light 310c.

At operation 612, the agent may obtain an input. In various aspects, the input may be a speech input (e.g., natural language input). For example, the agent may obtain (e.g., receive through a microphone) a natural language input, and the agent may parse the natural language input to identify an input set of attributes and an input control operation. In another aspect, the input may be received from a device (e.g., smartphone) communicatively coupled with the agent 302, and the input may be provided by a user. In the context of FIGS. 3-4, the agent 302 may obtain the command 430. In the example illustrated in FIG. 5, the agent 302' may obtain the IoT-control input 532.

At operation 614, the agent may determine whether the input corresponds to the at least one IoT device based on the stored registration information associated with the at least one IoT device. For example, the agent may process the input (e.g., using a neural network, such as a DNN) in order to identify an input set of attributes, and the agent may correlate the input set of attributes with a stored set of attributes stored as the registration information associated with the at least one IoT device. The agent may at least partially match one or more of the input set of attributes with one or more of the stored set of attributes, and the agent may determine the identifier associated with the IoT device that is associated with the stored set of attributes that at least partially matches the input set of attributes. In an aspect, the input may indicate an input spatial relationship between the at least one IoT device and the at least one other object, and the determining whether the input corresponds to the at least one IoT device may be based on correspondence (e.g., at least partially matching) between the input spatial attribute and a first spatial attribute included in the set of attributes associated with the at least one IoT device.

In the context of FIGS. 3-4, the agent 302 may process 432 the command 430 in order to identify an input set of attributes. The agent 302 may at least partially match the input set of attributes with a stored set of attributes associated with the first light 310c in order to determine that the command 430 is intended for the first light 310c. In the example illustrated in FIG. 5, the agent 302' may process the IoT-control input 532 in order to identify an input set of attributes. The agent 302 may at least partially match the input set of attributes with a stored set of attributes associated with the IoT device 310' in order to determine that the IoT-control input 532 is intended for the IoT device 310'.

At operation 616, the agent may control operation of the at least one IoT device when the input corresponds to the at least one IoT device. For example, the agent may generate a message that includes the first identifier corresponding to the (at least partially) matching set of attributes and associated with the at least one IoT device. The agent may process the input to identify a command for the at least one IoT device. The agent may include, in the generated message, an instruction to perform an operation consistent with the identified command. The agent may send the message over a network to the at least one IoT device. In the context of FIGS. 3-4, the agent 302 may control operation of the first light 310c by sending the instruction 434 to the first light 310c over the network 404a. In the example illustrated in FIG. 5, the agent 302' may control operation of the IoT device 310' by sending the instruction message 534 to the IoT device 310'.

Figure 7:
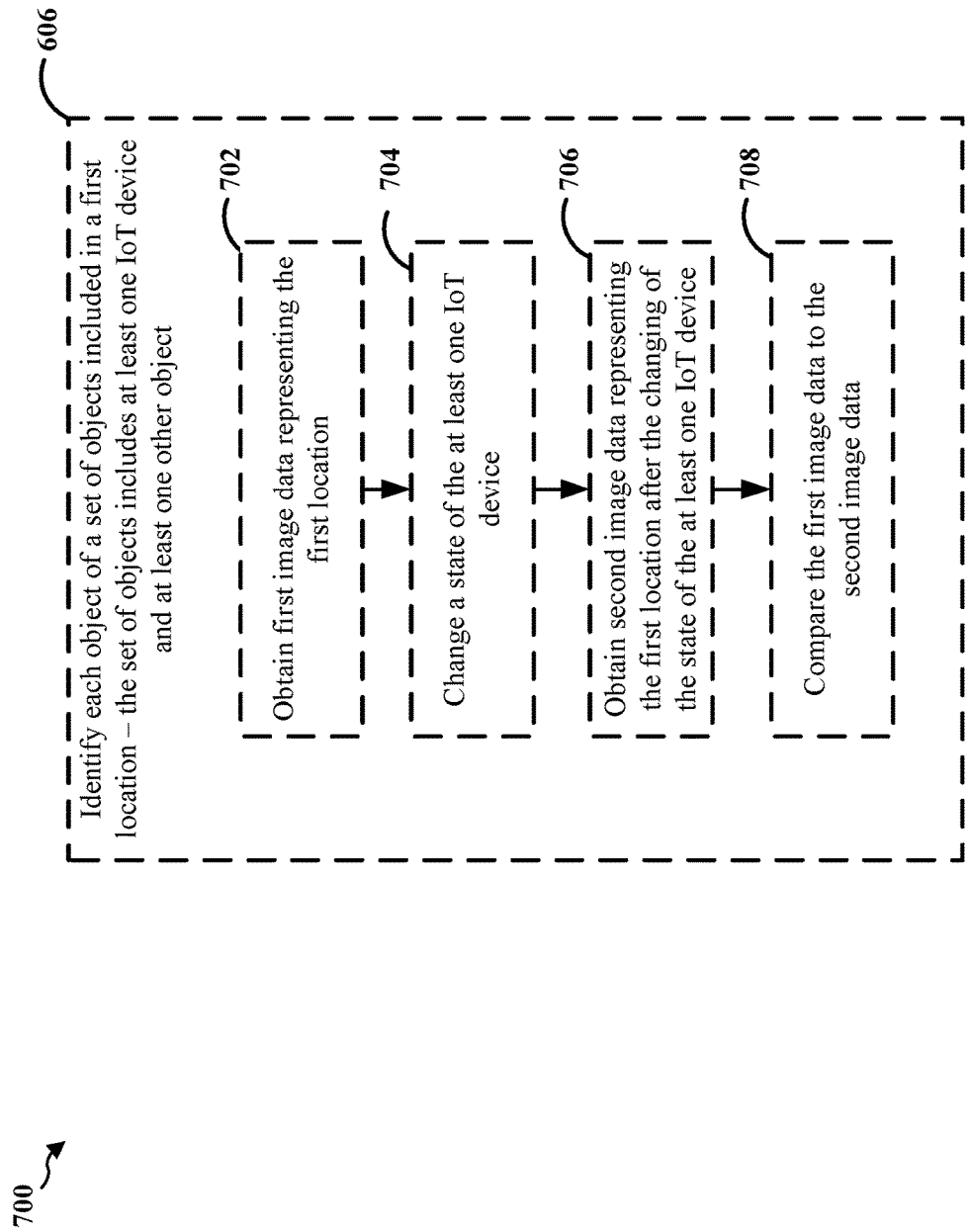
FIG. 7 is a flow diagram illustrating a method of discovering objects in a location, in accordance with aspects of the present disclosure.

With reference to FIG. 7, a flowchart illustrates one method 700 that is one aspect of operation 606, in which the agent may identify each object of a set of objects included in the first location. At operation 702, the agent may obtain first image data representing a first location that includes a set of objects. In an aspect, the set of objects may include at least one IoT device and at least one other object (e.g., a stationary object or another IoT device). For example, the agent may request, from a camera, first image data that represents a first location that includes a set of objects. Based on the request, the agent may receive the first image data that represents the first location.

In the context of FIGS. 3-4, the agent 302 may obtain first image data 426 representing the location 300 that includes the set of objects 310a-e, 312a-k. The set of objects may include the IoT devices 310a-e and the set of non-IoT objects 312a-k. In an aspect, the agent 302 may obtain the first image data 426 over a network 404a (e.g., via a camera that is communicatively coupled with the agent 302). In the example illustrated in FIG. 5, the agent 302' may obtain first image data 520 representing the location 300 that includes the set of objects 310a-e (310'), 312a-k. The set of objects may include the IoT devices 310a-e (310') and the set of non-IoT objects 312a-k. In an aspect, the agent 302' may obtain the first image data 520 through the camera 506.

At operation 704, the agent may change a state of the at least one IoT device. For example, the agent may generate a command including an identifier associated with the at least one IoT device, and the agent may send the command over a network to the at least one IoT device. The command may cause the at least one IoT device to change from a first state (e.g., power off, first channel, first temperature, etc.) to a second state (e.g., power on, second channel, second temperature, etc.). In the context of FIGS. 3-4, the agent 302 may cause a state change associated with the first light 310c by sending a message over the network 404a that includes an identifier associated with the first light 310c. In the example illustrated in FIG. 5, the agent 302' may detect 524 a state change associated with the first IoT device 310', for example, based on the input 525. In one aspect, the agent 302' may cause the state change to the IoT device 310'.

At operation 706, the agent may obtain, after the state change of the at least one IoT device, second image data representing the first location. For example, the agent may request, from a camera, second image data that represents the first location that includes the set of objects. Based on the request, the agent may receive the second image data that represents the first location. In the context of FIGS. 3-4, the agent 302 may obtain second image data 428 representing the location 300 that includes the set of objects 310a-e, 312a-k. For example, the agent 302 may obtain the second image data 428 over a network 404b, e.g., from a device that is communicatively coupled with the agent 302. In the example illustrated in FIG. 5, the agent 302' may obtain second image data 526 representing the location 300 that includes the set of objects 310a-e (310'), 312a-k. In an aspect, the agent 302/302' may obtain the second image data through the camera 506.

At operation 708, the agent may compare may compare the first image data to the second image data in order to detect one or more differences. For example, the agent may determine that the at least one IoT device is now in an "on" state based on the difference between the first image data (representing the at least one IoT device in an "off" state) and the second image data (representing the at least one IoT device in an "on" state), and the agent may determine that an identifier (and associated stored registration information) for at least one IoT device corresponds to the representation of the at least one IoT device in the first image data and/or the second image data.

In the context of FIGS. 3-4, the agent 302 may compare the second image data 428 to the first image data 426 in order to identify a difference between the second image data 428 and the first image data 426, and to identify the first light 310c that corresponds to the IoT device represented with the identified difference (e.g., the first light 310c is powered off in the first image data 426 but powered on in the second image data 428 may be identified). Accordingly, the agent 302 may store visual and/or spatial attributes and/or relationships corresponding to the first light 310c represented in the first image data 426 and/or the second image data 428. In the example illustrated in FIG. 5, the agent 302' may determine 528 attributes of the IoT device 310' based on comparing the first image data 520 with the second image data 526.

Figure 8:
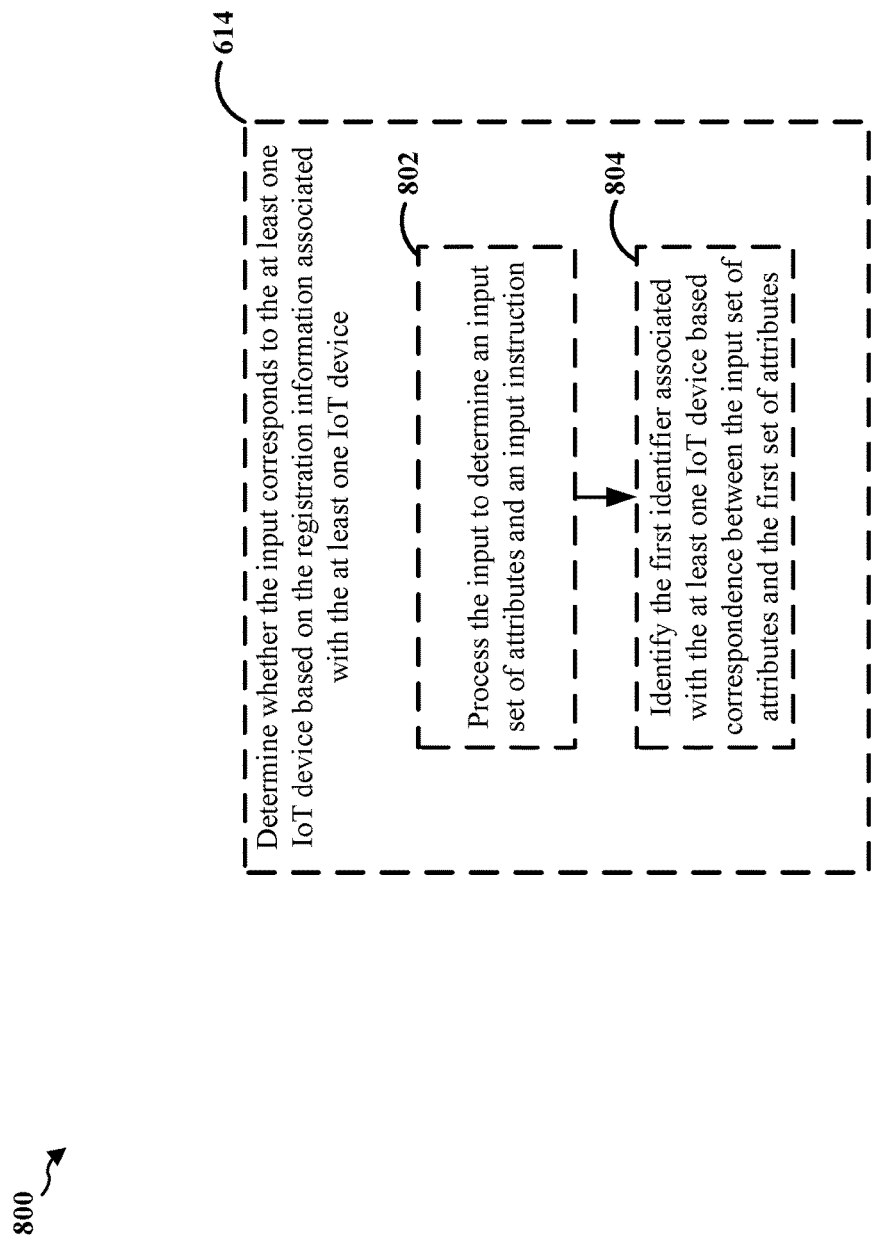
FIG. 8 is a flow diagram illustrating a method of determining whether an input corresponds with at least one IoT device, in accordance with aspects of the present disclosure.

With reference to FIG. 8, a flowchart illustrates one method 800 that is one aspect of operation 614, in which the agent may determine whether the input corresponds to the at least one IoT device based on the stored registration information associated with the at least one IoT device. At operation 802, the agent may process the input to determine an input set of attributes and an instruction. In various aspects, the input may be speech input, written input, and/or other input received by the agent (e.g., via a device communicatively coupled with the agent). For example, the agent may obtain a speech input (e.g., natural language input) that describes at least one IoT device (e.g., through a microphone) or image data (e.g., through a camera that depicts selection or identification (e.g., by a user) of the at least one IoT device. The agent may process or parse the input (e.g., using a neural network) to determine an input set of attributes and an input instruction. In the context of FIGS. 3-4, the agent 302 may process 432 a command 430 received over a network 404b. For example, the agent 302 may process 432 the command 430 to identify an input set of attributes and an input command. In the example illustrated in FIG. 5, the agent 302' may obtain an IoT-control input 532 (e.g., through a camera 506 and/or microphone 508) associated with the first IoT device 310'.

At operation 804, the agent may identify the first identifier associated with the at least one IoT device based on correspondence between the input set of attributes and the first set of attributes stored for the at least one IoT device. For example, the agent may compare the input set of attributes to one or more registered sets of attributes (e.g., stored as registration information for the at least one IoT device). The agent may determine whether the input set of attributes at least partially matches a stored set of attributes. If the agent determines that the input set of attributes at least partially matches a stored set of attributes, then the agent may identify the first identifier that corresponds to the matching registered set of attributes. Accordingly, the agent may send an instruction message to the identifier at least one IoT device, and the instruction message may include the first identifier and indicate the input command in order to control the at least one IoT device. In the context of FIGS. 3-4, the agent 302 may process 432 the command 430 to determine whether an input set of attributes included in the command 430 at least partially matches the stored set of attributes associated with the first light 310c. When the input set of attributes included in the command 430 at least partially matches the stored set of attributes associated with the first light 310c, the agent 302 may send an instruction 434 to the first light 310c. The agent may generate the instruction 434 to include the identifier associated with the first light 310c and the input command in order to control the first light 310c. In the example illustrated in FIG. 5, the agent 302' may identify the first identifier corresponding to the first IoT device 310' based on IoT-control input 532 and the stored registration information (e.g., storage 530).

In one configuration, an agent, neural network, machine-learning model, computational network, processor, apparatus or other system is configured to identify each object of a set of objects included in a first location, and the set of objects may include at least one IoT device and at least one other object. The agent, neural network, machine-learning model, computational network, processor, apparatus or other system is further configured to determine a first set of attributes for the at least one IoT device, and the first set of attributes may indicate a first spatial relationship between the at least one IoT device and the at least one other object. The agent, neural network, machine-learning model, computational network, processor, apparatus or other system is further configured to store registration information associated with the at least one IoT device, and the registration information may include a first identifier associated with the at least one IoT device and may include the first set of attributes for the at least one IoT device. The agent, neural network, machine-learning model, computational network, processor, apparatus or other system is further configured to obtain an input. The agent, neural network, machine-learning model, computational network, processor, apparatus or other system is further configured to determine whether the input corresponds to the at least one IoT device based on the registration information associated with the at least one IoT device. The agent, neural network, machine-learning model, computational network, processor, apparatus or other system is further configured to control the at least one IoT device when the input corresponds to the at least one IoT device.

The agent, neural network, machine-learning model, computational network, processor, apparatus or other system may include means for identifying each object of a set of objects included in a first location, and the set of objects may include at least one IoT device and at least one other object. The means for identifying each object of a set of objects included in a first location may be the general-purpose processor 102, program memory associated with the general-purpose processor 102, and/or memory block 118 configured to perform the functions recited. In another configuration, the means for identifying each object of a set of objects included in a first location may be any module, any component, and/or any apparatus configured to perform the functions recited by the aforementioned means, such as the agent 302/302' or a component thereof.

The agent, neural network, machine-learning model, computational network, processor, apparatus or other system may include means for determining a first set of attributes for the at least one IoT device, and the first set of attributes may indicate a first spatial relationship between the at least one IoT device and the at least one other object. The means for determining a first set of attributes for the at least one IoT device may be the general-purpose processor 102, program memory associated with the general-purpose processor 102, and/or memory block 118 configured to perform the functions recited. In another configuration, the means for determining a first set of attributes for the at least one IoT device may be any module, any component, and/or any apparatus configured to perform the functions recited by the aforementioned means, such as the agent 302/302' or a component thereof.

The agent, neural network, machine-learning model, computational network, processor, apparatus or other system may include means for storing registration information associated with the at least one IoT device, and the registration information may include a first identifier associated with the at least one IoT device and may include the first set of attributes for the at least one IoT device. The means for storing registration information associated with the at least one IoT device may be the general-purpose processor 102, program memory associated with the general-purpose processor 102, and/or memory block 118 configured to perform the functions recited. In another configuration, the means for storing registration information associated with the at least one IoT device may be any module, any component, and/or any apparatus configured to perform the functions recited by the aforementioned means, such as the agent 302/302' or a component thereof.

The agent, neural network, machine-learning model, computational network, processor, apparatus or other system may include means for obtaining an input. The means for obtaining an input may be the general-purpose processor 102, program memory associated with the general-purpose processor 102, and/or memory block 118 configured to perform the functions recited. In another configuration, the obtaining an input may be any module, any component, and/or any apparatus configured to perform the functions recited by the aforementioned means, such as the agent 302/302' or a component thereof.

The agent, neural network, machine-learning model, computational network, processor, apparatus or other system may include means for determining whether the input corresponds to the at least one IoT device based on the registration information associated with the at least one IoT device. The means for determining whether the input corresponds to the at least one IoT device based on the registration information associated with the at least one IoT device may be the general-purpose processor 102, program memory associated with the general-purpose processor 102, and/or memory block 118 configured to perform the functions recited. In another configuration, the means for determining whether the input corresponds to the at least one IoT device based on the registration information associated with the at least one IoT device may be any module, any component, and/or any apparatus configured to perform the functions recited by the aforementioned means, such as the agent 302/302' or a component thereof.

The agent, neural network, machine-learning model, computational network, processor, apparatus or other system may include means for controlling the at least one IoT device when the input corresponds to the at least one IoT device. The means for controlling the at least one IoT device when the input corresponds to the at least one IoT device may be the general-purpose processor 102, program memory associated with the general-purpose processor 102, and/or memory block 118 configured to perform the functions recited. In another configuration, the means for controlling the at least one IoT device when the input corresponds to the at least one IoT device may be any module, any component, and/or any apparatus configured to perform the functions recited by the aforementioned means, such as the agent 302/302' or a component thereof.

The agent, neural network, machine-learning model, computational network, processor, apparatus or other system may include means for receiving, over a network, information associated with the at least one IoT device, the information including at least an identifier associated with the at least one IoT device. The means for receiving, over a network, information associated with the at least one IoT device, the information including at least an identifier associated with the at least one IoT device may be the general-purpose processor 102, program memory associated with the general-purpose processor 102, and/or memory block 118 configured to perform the functions recited. In another configuration, the means for receiving, over a network, information associated with the at least one IoT device, the information including at least an identifier associated with the at least one IoT device may be any module, any component, and/or any apparatus configured to perform the functions recited by the aforementioned means, such as the agent 302/302' or a component thereof.

The agent, neural network, machine-learning model, computational network, processor, apparatus or other system may include means for determining to identify a set of IoT devices. The means for determining to identify a set of IoT devices may be the general-purpose processor 102, program memory associated with the general-purpose processor 102, and/or memory block 118 configured to perform the functions recited. In another configuration, the means for determining to identify a set of IoT devices may be any module, any component, and/or any apparatus configured to perform the functions recited by the aforementioned means, such as the agent 302/302' or a component thereof.

According to certain aspects of the present disclosure, a local processing unit may be configured to determine parameters of the model based upon desired one or more functional features of the model, and develop the one or more functional features towards the desired functional features as the determined parameters are further adapted, tuned and updated.

In some aspects, the methods 400, 500, 600, 700, 800 may be performed by the SOC 100 (FIG. 1). That is, each of the operations of methods 400, 500, 600, 700, 800 may, for example, but without limitation, be performed by the SOC 100 or one or more processors (e.g., CPU 102) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may include a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may include a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may include packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may include one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may include a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of operation of a system, the method comprising:
obtaining first image data representing a location;
identifying each object of a set of objects included in the location;
obtaining second image data representing the location after a changing of a state of at least one Internet-of-Things (IoT) device;
identifying the at least one IoT device based on a difference between the first image data and the second image data;
storing registration information associated with the at least one IoT device, the registration information including a first identifier associated with the at least one IoT device and including a first set of attributes for the at least one IoT device;
matching a description associated with an input to the first set of attributes based on a representation indicating at least one of a spatial attribute or a visual attribute of the at least one IoT device in a location that includes the at least one IoT device, wherein the description indicates a spatial relationship between the at least one IoT device and at least one other object in the location; and
controlling operation of the at least one IoT device based on an instruction included in the input when the description is matched to the first set of attributes of the at least one IoT device.

2. The method of claim 1, wherein the first set of attributes further comprises at least one of the visual attribute associated with the at least one IoT device or the spatial attribute associated with the at least one IoT device, and at least one of a classification associated with the at least one IoT device or a capability attribute associated with the at least one IoT device.

3. The method of claim 1, further comprising:
processing the input to determine the description and the instruction; and
identifying the first identifier associated with the at least one IoT device based on matching the description to the first set of attributes,
wherein the first identifier is used for the controlling the operation of the at least one IoT.

4. The method of claim 1, wherein the input comprises a natural language input.

5. The method of claim 1, further comprising:
determining the first set of attributes for the at least one IoT device, the first set of attributes indicating the at least one of the spatial attribute or the visual attribute of the at least one IoT device in the location, wherein the set of objects includes the at least one IoT device.

6. The method of claim 1, wherein the identifying each object of the set of objects included in the location comprises:
changing a state of the at least one IoT device.

7. The method of claim 1, wherein the description is matched to the first set of attributes based on correspondence between the spatial relationship and the at least one of the spatial attribute or the visual attribute of the at least one IoT device in the location.

8. The method of claim 1, further comprising:
determining to identify a set of IoT devices,
wherein the identifying each object of the set of objects included in the location is based on the determining to identify the set of IoT devices.

9. The method of claim 1, further comprising:
receiving, over a network, information associated with the at least one IoT device, the information including at least the first identifier associated with the at least one IoT device; and
associating the first identifier with the first set of attributes for the at least one IoT device, wherein the operation of the at least one IoT device is controlled using the first identifier.

10. An apparatus for operating a system, the apparatus comprising:
means for obtaining first image data representing a location;
means for identifying each object of a set of objects included in the location;
means for obtaining second image data representing the location after a changing of a state of at least one Internet-of-Things (IoT) device;
means for identifying the at least one IoT device based on a difference between the first image data and the second image data;
means for storing registration information associated with the at least one IoT device, the registration information including a first identifier associated with the at least one IoT device and including a first set of attributes for the at least one IoT device;
means for matching a description associated with an input to the first set of attributes based on a representation indicating at least one of a spatial attribute or a visual attribute of the at least one IoT device in a location that includes the at least one IoT device, wherein the description indicates a spatial relationship between the at least one IoT device and at least one other object in the location; and
means for controlling operation of the at least one IoT device based on an instruction included in the input when the description is matched to the first set of attributes of the at least one IoT device.

11. The apparatus of claim 10, wherein the first set of attributes further comprises at least one of the visual attribute associated with the at least one IoT device or the spatial attribute associated with the at least one IoT device, and at least one of a classification associated with the at least one IoT device or a capability attribute associated with the at least one IoT device.

12. The apparatus of claim 10, further comprising:
means for processing the input to determine the description and the instruction; and
means for identifying the first identifier associated with the at least one IoT device based on matching the description to the first set of attributes,
wherein the first identifier is used for the controlling the operation of the at least one IoT device.

13. The apparatus of claim 10, wherein the input comprises a natural language input.

14. The apparatus of claim 10, further comprising:
means for determining the first set of attributes for the at least one IoT device, the first set of attributes indicating the at least one of the spatial attribute or the visual attribute of the at least one IoT device in the location, wherein the set of objects includes the at least one IoT device.

15. The apparatus of claim 10, wherein the means for identifying each object of the set of objects included in the first location is configured to:
change a state of the at least one IoT device.

16. The apparatus of claim 10, wherein the description is matched to the first set of attributes based on correspondence between the spatial relationship and the at least one of the spatial attribute or the visual attribute of the at least one IoT device in the location.

17. The apparatus of claim 10, further comprising:
means for determining to identify a set of IoT devices,
wherein the identifying each object of the set of objects included in the location is based on the determining to identify the set of IoT devices.

18. The apparatus of claim 10, further comprising:
means for receiving, over a network, information associated with the at least one IoT device, the information including at least the first identifier associated with the at least one IoT device; and
means for associating the first identifier with the first set of attributes for the at least one IoT device, wherein the operation of the at least one IoT device is controlled using the first identifier.

19. An apparatus for operating a system, the apparatus comprising:
a memory; and
at least one processor coupled to the memory and configured to:
obtain first image data representing a location;
identify each object of a set of objects included in the location;
obtain second image data representing the location after a changing of a state of at least one Internet-of-Things (IoT) device;
identify the at least one IoT device based on a difference between the first image data and the second image data;
store registration information associated with the at least one IoT device, the registration information including a first identifier associated with the at least one IoT device and including a first set of attributes for the at least one IoT device;
match a description associated with an input to the first set of attributes based on a representation indicating at least one of a spatial attribute or a visual attribute of the at least one IoT device in a location that includes the at least one IoT device, wherein the description indicates a spatial relationship between the at least one IoT device and at least one other object in the location; and
control operation of the at least one IoT device based on an instruction included in the input when the description is matched to the first set of attributes of the at least one IoT device.

20. The apparatus of claim 19, wherein the first set of attributes further comprises at least one of the visual attribute associated with the at least one IoT device or the spatial attribute associated with the at least one IoT device, and at least one of a classification associated with the at least one IoT device or a capability attribute associated with the at least one IoT device.

21. The apparatus of claim 19, wherein the at least one processor is further configured to:
process the input to determine the description and the instruction; and
identify the first identifier associated with the at least one IoT device based on matching the description to the first set of attributes,
wherein the first identifier is used for the controlling the operation of the at least one IoT device.

22. The apparatus of claim 19, wherein the input comprises a natural language input.

23. The apparatus of claim 19, wherein the at least one processor is further configured to:
determine the first set of attributes for the at least one IoT device, the first set of attributes indicating the at least one of the spatial attribute or the visual attribute of the at least one IoT device in the location, wherein the set of objects includes the at least one IoT device.

24. The apparatus of claim 19, wherein the identification of each object of the set of objects included in the first location comprises to:
change a state of the at least one IoT device.

25. The apparatus of claim 19, wherein the description is matched to the first set of attributes based on correspondence between the spatial relationship and the at least one of the spatial attribute or the visual attribute of the at least one IoT device in the location.

26. The apparatus of claim 19, wherein the at least one processor is further configured to:
determine to identify a set of IoT devices,
wherein the identification of each object of the set of objects included in the location is based on the determination to identify the set of IoT devices.

27. The apparatus of claim 19, wherein the at least one processor is further configured to:
receive, over a network, information associated with the at least one IoT device, the information including at least the first identifier associated with the at least one IoT device; and
associate the first identifier with the first set of attributes for the at least one IoT device, wherein the operation of the at least one IoT device is controlled using the first identifier.

28. A non-transitory, computer-readable medium storing computer-executable code for operation of a system, comprising code to:
obtain first image data representing a location;
identify each object of a set of objects included in the location;
obtain second image data representing the location after a changing of a state of at least one Internet-of-Things (IoT) device;
identify the at least one IoT device based on a difference between the first image data and the second image data;
store registration information associated with the at least one IoT device, the registration information including a first identifier associated with the at least one IoT device and including a first set of attributes for the at least one IoT device;
match a description associated with an input to the first set of attributes based on a representation indicating at least one of a spatial attribute or a visual attribute of the at least one IoT device in a location that includes the at least one IoT device, wherein the description indicates a spatial relationship between the at least one IoT device and at least one other object in the location; and
control operation of the at least one IoT device based on an instruction included in the input when the description is matched to the first set of attributes of the at least one IoT device.

* * * * *